United States Patent [19]

Parsons

[11] 4,407,125

[45] Oct. 4, 1983

[54] LIQUID PRESSURE APPARATUS

[75] Inventor: David Parsons, Leamington Spa, England

[73] Assignee: Automotive Products Limited, Leamington Spa, England

[21] Appl. No.: 911,477

[22] Filed: Jun. 1, 1978

Related U.S. Application Data

[63] Continuation of Ser. No. 676,474, Apr. 13, 1976, abandoned.

[30] Foreign Application Priority Data

Apr. 14, 1975 [GB] United Kingdom ............... 15283/75

[51] Int. Cl.³ ............................................. B60T 11/30
[52] U.S. Cl. ........................................ 60/584; 60/585; 60/592
[58] Field of Search .................. 60/583, 584, 585, 588, 60/592, 586

[56] References Cited

U.S. PATENT DOCUMENTS

| | | | |
|---|---|---|---|
| 2,152,485 | 3/1939 | Kindl | 60/588 |
| 2,316,497 | 4/1943 | Woodhouse | 60/588 |
| 2,977,767 | 4/1961 | Randol | 60/588 |
| 3,023,924 | 3/1962 | Boyer | 60/585 |
| 3,307,667 | 3/1967 | Maurice | 60/588 |
| 3,370,426 | 2/1967 | Fay | 60/584 |
| 3,802,200 | 4/1974 | Kolm | 60/588 |

Primary Examiner—Abraham Hershkovitz
Attorney, Agent, or Firm—Kemon & Estabrook

[57] ABSTRACT

Friction clutch release apparatus for a motor vehicle comprises a driver-operable master cylinder, a slave cylinder and a conduit which connects the master outlet to the slave cylinder inlet. A liquid reservoir communicates with the bore of the master cylinder between the piston and the outlet when the piston is retracted and has a vent port. The apparatus is assembled, filled with liquid and bled before being installed on the motor vehicle. The vent port may be closed temporarily for convenience of transport and storage after the apparatus is bled, for example by use of a suitable removable closure device which would be removed after installation of the apparatus on the motor vehicle, or may include a movable wall within the reservoir chamber by which liquid within the chamber is separated from that part of the chamber with which the vent port communicates. The vent port may be closed temporarily by a strip of adhesive tape, a bung or other suitable closure device which can be removed readily, or by a puncturable membrane. The movable wall may be a bellows.

2 Claims, 10 Drawing Figures

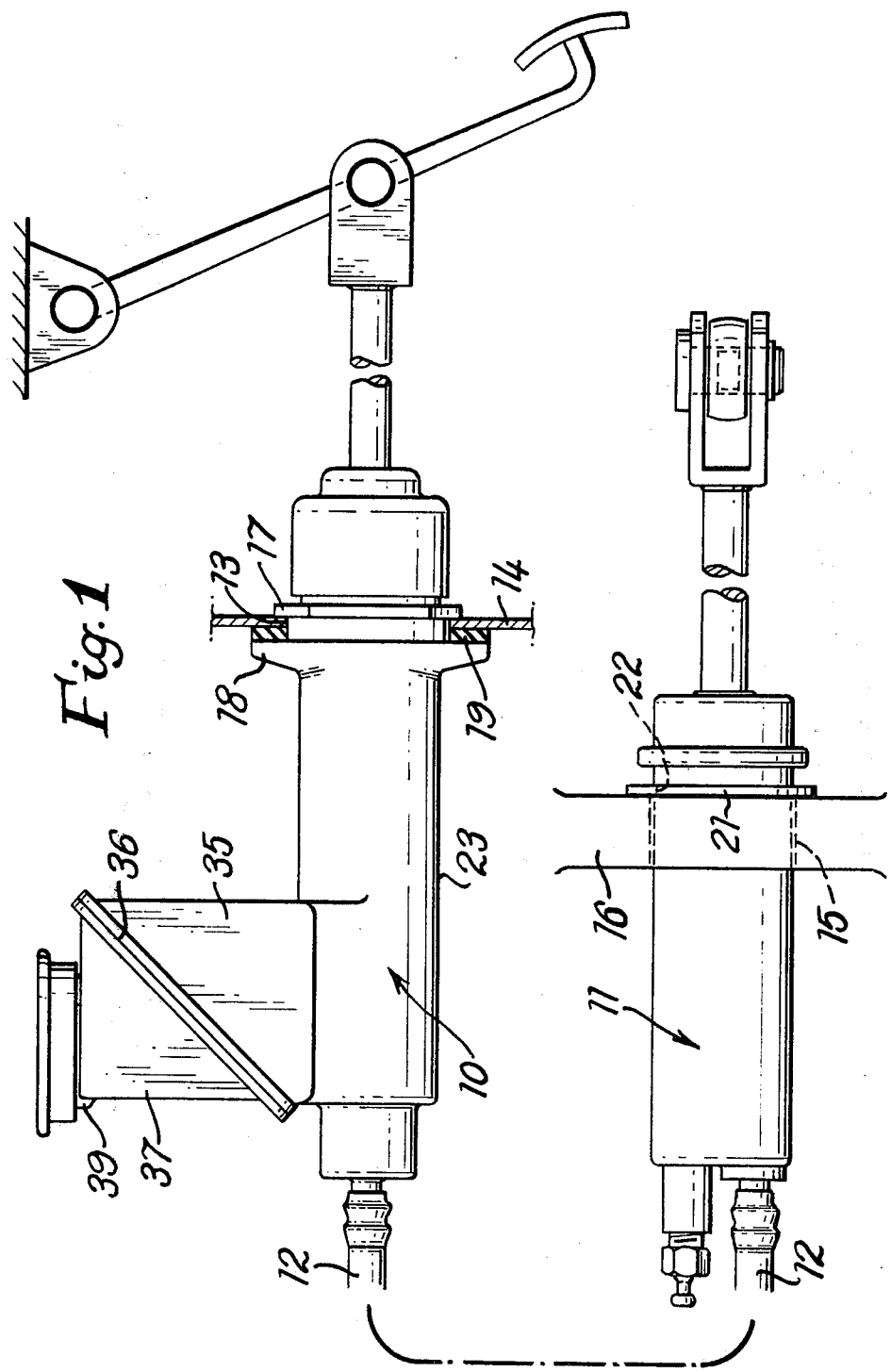

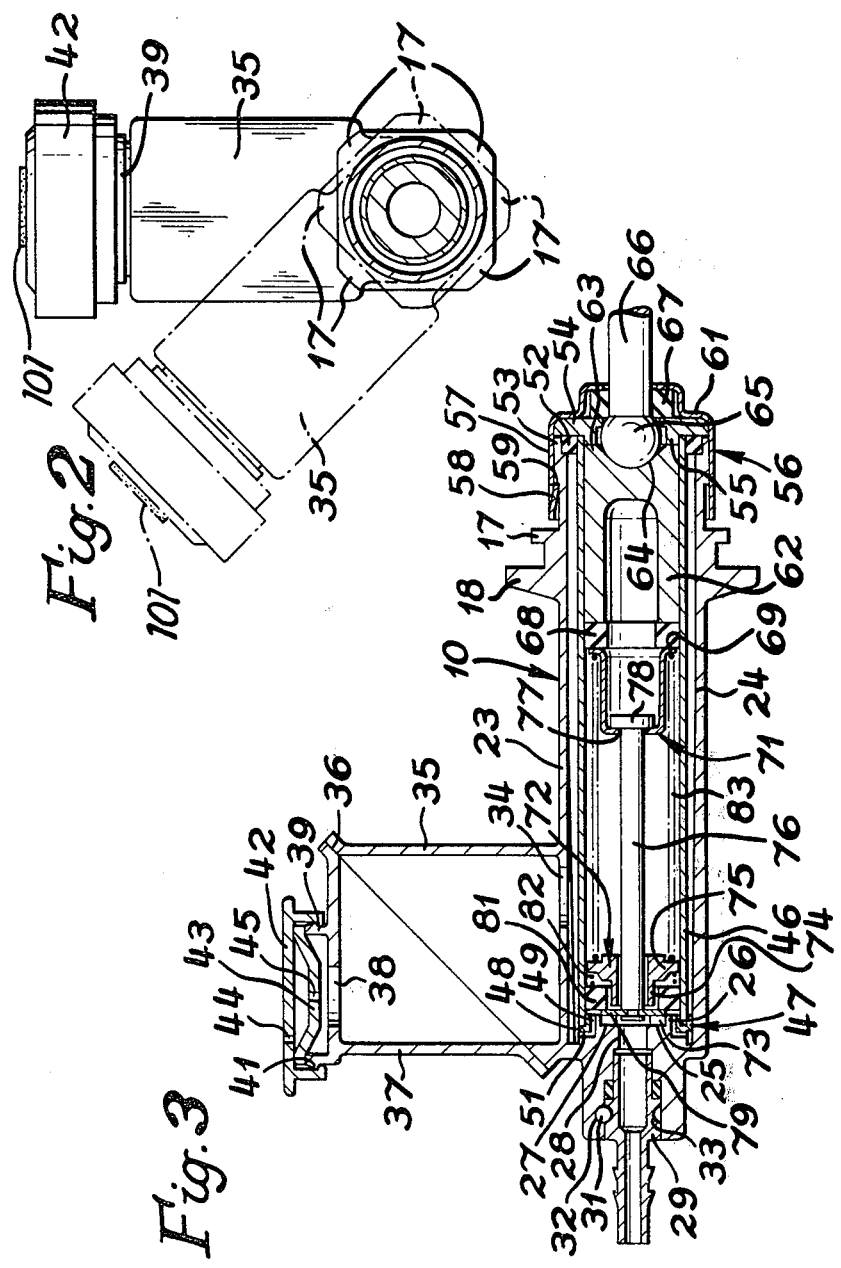

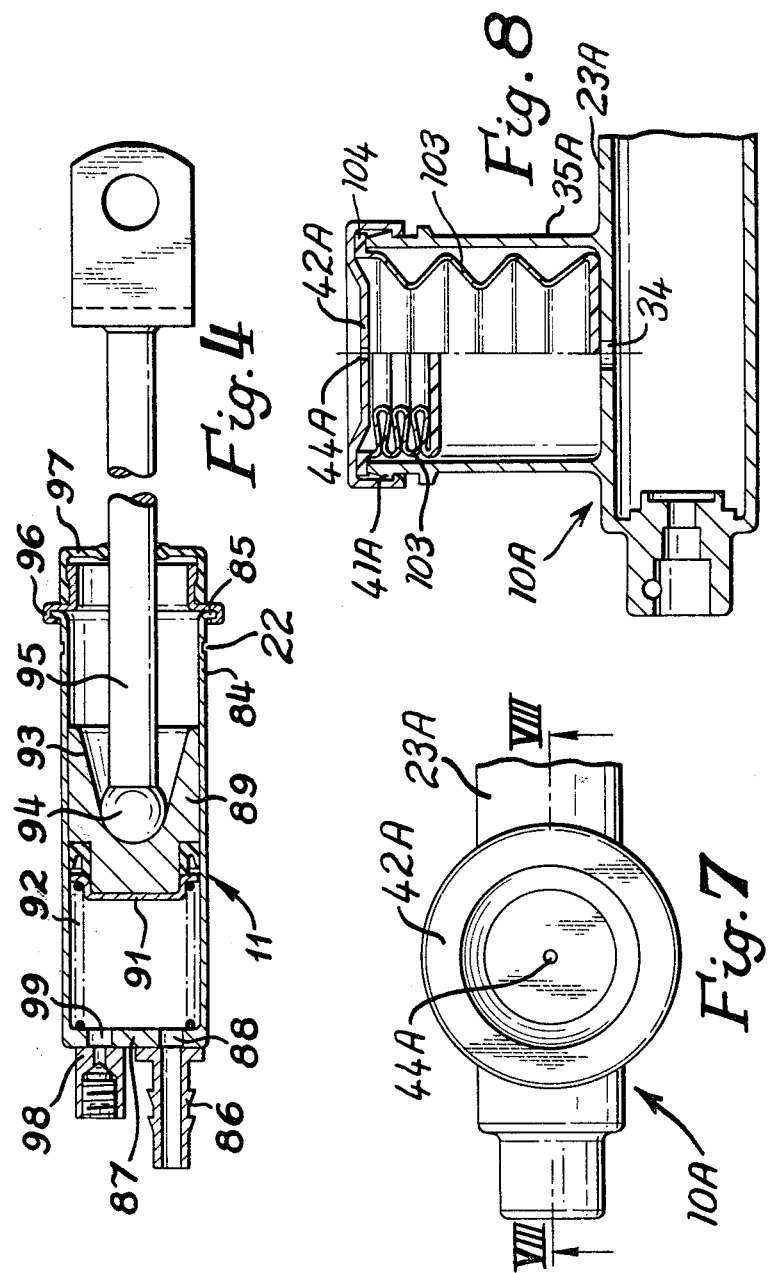

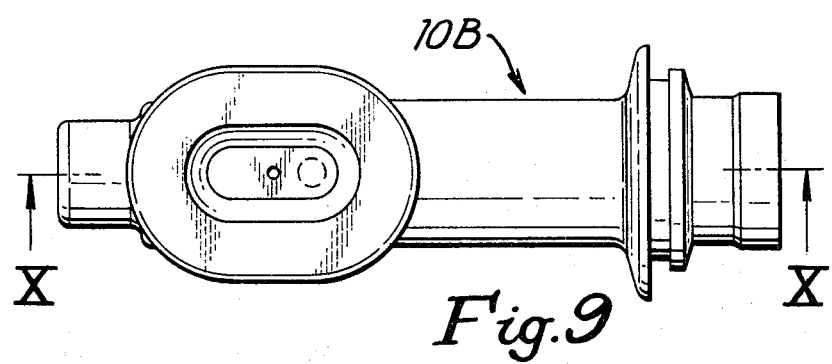
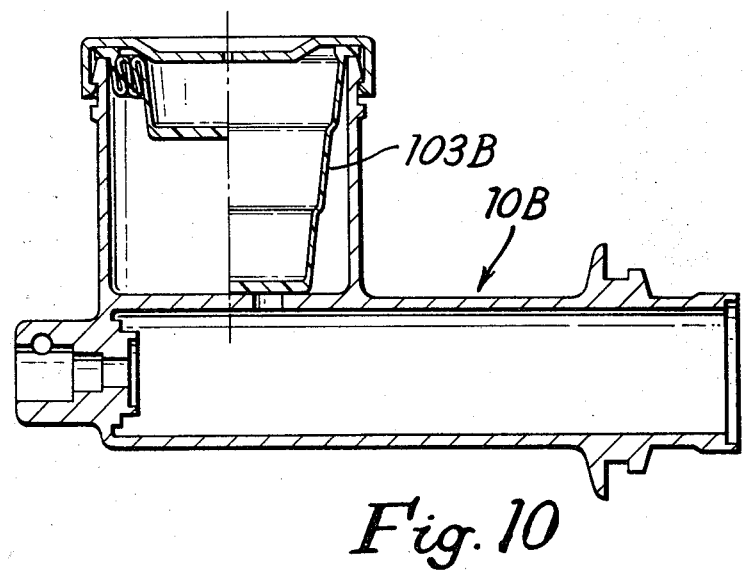

LIQUID PRESSURE APPARATUS

This is a continuation, of application Ser. No. 676,474, filed Apr. 13, 1976, now abandoned.

This invention relates to apparatus which is operable to provide a working thrust at a remote station by displacement of liquid under pressure from a master cylinder to a slave cylinder at the remote station; the apparatus comprising the master cylinder; the slave cylinder; a conduit which connects a liquid pressure outlet of the master cylinder to an inlet of the slave cylinder; and a liquid reservoir which has a port which communicates with the liquid containing chamber thereof below the normal level of liquid contained therein and which is in communication with a port in the master cylinder which is open when the master cylinder piston is at the end of its stroke remote from the master cylinder outlet so that the liquid containing chamber of the reservoir is in communication with the bore of the master cylinder between the master cylinder piston and the liquid pressure outlet and which is closed when liquid is displaced under pressure from the master cylinder through the liquid pressure outlet by movement of the master cylinder piston towards the liquid pressure outlet, and a vent port which communicates with the liquid containing chamber of the reservoir above the normal level of liquid contained therein and which places the space within the liquid contained chamber that is above the normal level of liquid therein in communication with an air space which is at a pressure which is substantially atmospheric. Such apparatus will be identified in this specification as apparatus of the kind referred to from hereon. The invention is concerned particularly with apparatus of the kind referred to that is designed for use to provide the thrust required to release a motor vehicle friction clutch.

It is common practice for the various components of friction clutch release apparatus of the kind referred to to be installed separately on the vehicle and for the connections between those components to be made only after those components have been installed. It is then necessary to fill the apparatus with liquid and to bleed the apparatus in order to remove entrapped gas from the liquid filled parts of the system.

An object of this invention is to simplify the installation of friction clutch release apparatus of the kind referred to on a vehicle and to reduce the time required for such installation. This object is achieved in accordance with one aspect of this invention by assembling friction clutch release apparatus of the kind referred to, filling that apparatus with liquid and bleeding that apparatus before that apparatus is installed on a motor vehicle. Such a method of assembling friction clutch release apparatus may include the step of closing the vent port temporarily after the apparatus is bled, for example by use of a suitable removable closure device, for convenience of transport and/or storage. Such a removable closure device would be removed after the apparatus has been installed on a motor vehicle when used. More generally, a method of assembling friction clutch release apparatus of the kind referred to, which embodies this invention, may include the step of opening the vent port after the apparatus has been installed on a motor vehicle.

According to another aspect of this invention there is provided apparatus of the kind referred to which has been assembled for installation on a motor vehicle, the apparatus containing sufficient liquid to maintain the normal level of liquid within the reservoir and including an impermeable barrier which prevents leakage of liquid from within the apparatus through the vent port.

Conveniently the impermeable barrier is effective to prevent leakage of liquid through the vent port prior to and during installation of the apparatus on a motor vehicle, and is adapted to be rendered inoperative once the apparatus has been installed so that the apparatus is then in condition for use.

The impermeable barrier may close the vent port temporarily and may comprise a removable closure device such as a strip of adhesive tape which covers the vent port and which can be peeled off readily to open that vent port, a bung or other suitable closure device which can be removed readily. Alternatively the impermeable barrier may comprise a puncturable membrane.

The impermeable barrier of one form of apparatus of the kind referred to in which this invention is embodied comprises a movable wall within the liquid containing chamber of the reservoir, the movable wall separating that part of the chamber in which liquid is contained from the remainder of the chamber that is in communication with the external air space through the vent port. The movable wall may be a deformable wall which has its periphery fixed to the structure of the liquid containing chamber in a fluid tight manner. Preferably the periphery of the bellows may be clamped between a rim, which is formed by a circumferential wall portion of the reservoir, and a closure cap which closes the cylindrical aperture formed by that wall portion. The bellows may be arranged so that its convolutions extend in a generally radial direction relative to its axis when it is contracted. Alternatively the bellows may be arranged so that its convolutions extend generally parallel to its axis when it is contracted.

Several embodiments of this invention will be described now by way of example with reference to the accompanying drawings, of which:

FIG. 1 illustrates one form of hydraulic friction clutch release apparatus and a mounting for the master cylinder and for the slave cylinder components when the apparatus is installed in a vehicle;

FIG. 2 is an end view of the master cylinder component of the apparatus shown in FIG. 1 and illustrates installation of that component in a vehicle;

FIG. 3 is a longitudinal section of the master cylinder component of the apparatus shown in FIG. 1 prior to assembly with the remainder of the apparatus;

FIG. 4 is a longitudinal section of the slave cylinder component of the apparatus shown in FIG. 1 prior to assembly with the remainder of the apparatus;

FIG. 7 is a plan view of part of another form of master cylinder for use in apparatus which comprises another embodiment of this invention;

FIG. 8 is a section on the line VIII—VIII of FIG. 7;

FIG. 9 is a plan view of a further form of master cylinder for use in apparatus which comprises a further embodiment of this invention; and FIG. 10 is a section on the line X—X of FIG. 9.

Figure 5:
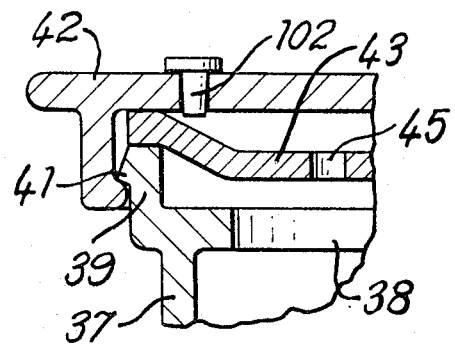
FIGS. 5 and 6 are sectioned fragments which are similar to a part of FIG. 3 and which illustrate other embodiments of this invention.

The hydraulic clutch release apparatus shown in FIG. 1 comprises a master cylinder 10, a slave cylinder 11, and a flexible connecting pipe 12 which is formed of a suitable material such as nylon. The master cylinder 10 is mounted in a hole 13 in a bulkhead 14 and the slave cylinder is mounted in a hole 15 in a boss 16 which is formed on the gearbox bell housing of the vehicle.

The master cylinder 10 is provided, adjacent the end of the master cylinder body remote from the pipe 12, with four substantially triangular ears 17 which together define a square, as is best seen in FIG. 2. Also the master cylinder body has a circular flange 18 which has a diameter that is greater than the length of the diagonal of the square defined by the ears 17. The circular flange 18 is spaced from the ears 17 towards the end of the master cylinder which is connected to the pipe 12.

The hole 13 in the bulkhead 14 is square. The size of the square hole 13 is just sufficient to permit passage of the square that is defined by the ears 17. After passage of the ears 17 through the hole 13, the master cylinder 10 is turned through an angle of approximately 45° from the position in which the ears 17 were passed through the hole 13 and which is shown chain dotted in FIG. 2, to the position which is shown in full lines in FIG. 2 in which the master cylinder 10 is locked in position with respect to the bulkhead 14. A resilient gasket 19 is compressed between the circular flange 18 and the bulkhead 14 to press the ears 17 firmly against the surface of the bulkhead 14.

The slave cylinder 11 is inserted through the aperture 15 in the boss 16 and is retained in position therein by engagement of a circlip 21 within a peripheral groove 22 that is formed in the cylindrical outer surface of the body of the slave cylinder 11.

Referring to FIG. 3, the master cylinder 10 comprises a body 23 which has a cavity 24 formed therein. The body 23 is a moulding of a suitable plastics material such as nylon or polypropylene. An end wall 25 integral with the body 23 substantially closes one end of the cavity 24 and includes a hollow boss 26 which projects into the cavity 24. The inner wall surface of the cavity 24 is a surface of revolution which tapers from one end to the other, the larger diameter end of the tapered surface of revolution being at the end of that surface remote from the end wall 25 and the smaller diameter end being at the end wall 25.

The hollow boss 26 defines a cylindrical cavity 27. An outlet orifice 28 leads from the centre of the cylindrical cavity 27. A tubular connector 29 is suitably mounted in the outlet orifice 28, being retained therein by a pin 31 which is passed through a hole 32 in the body 23 and which is engaged within a circumferential groove 33 in the connector 29.

A side opening 34 in the cavity 24 opens into a reservoir chamber formed within a cylindrical reservoir. The reservoir has a portion 35 of its cylindrical wall integral with the body 23 and terminating in an end surface 36 at 45° to its axis. A separately formed section 37 of the reservoir also has a cylindrical wall with an end surface of 45° to its axis, and is welded to the integrally formed portion 35 at a selected one of two positions. The arrangement is such that, if the master cylinder 10 is to be mounted for use with its axis horizontal, one of the two positions is selected, and if the master cylinder 10 is to be mounted for use with its axis vertical the other position is selected so that a filling orifice 38 in the end wall of the separately formed reservoir portion 37 will be at the top of the reservoir when the master cylinder 10 is mounted for use. The filling orifice 38 is surrounded by a cylindrical boss 39 that is integral with the separately formed reservoir portion 37 and which has an external circumferential rib 41. A reservoir cap 42 is a snap fit over the external rib of the cylindrical boss 39 so as to close the filling orifice 38. A dished baffle plate 43 is trapped between the cap 42 and the cylindrical boss 39. Vent ports 44 and 45 are formed in the end cap 42 and the baffle plate 43 respectively.

A metal tube 46 having plain cylindrical outer and inner walls and which, conveniently, is parted off from an extruded length of standard tubing, is mounted coaxially in the cavity 24 so that an annular space is defined between the tube and the tapered surface of the cavity 24. The tube 46 is located radially at its end which is nearer to the end wall 25 by a support ring 47 which is spigotted into the tube 46. The ring 47 is fitted onto the hollow boss 26, by which it is located radially, and has an outwardly directed radial flange 48 which separates the end of the metal tube 46 from the end wall 25. Axially extending grooves 49 in the inner surface of the ring 47 communicate with radial grooves 51 in the end face of that ring 47 that abuts the end wall 25 and, together with the annular space defined between the tube 46 and the inner surface of the cavity 24, provide a path for communication between the bore of the tube 46 and the side opening 34 to the reservoir. The support ring 47 may be a plastics moulding or a sintered metal compact.

An O-ring type seal 52 is mounted in an internal recess 53 in the open end of the cavity 24. The seal 52 engages the body 23 and the outer surface of the metal tube 46 and thus seals the annular space between the body 23 and the metal tube 46.

An annular end cap 54 of plastics material has a cylindrical projection 55, which is spigotted into the end of the metal tube 46 that is remote from the end wall 25, and a flat radial face which is held against the end of the body 23 remote from the end wall 25 by a metal retainer 56 so as to retain the tube 46 and the O-ring seal 52 within the cavity 24 of the body 23. The metal retainer 56 has a first cylindrical portion 57 which surrounds the end of the body 23, tongues 58 which are deformed inwardly from the first cylindrical portion 57 to engage behind an annular shoulder 59 on the body 23 and a top-hat section portion 61 which extends radially inwardly from the first cylindrical portion 57. The annular end cap 54 is trapped between the brim of the top-hat section portion 61 and the end of the body 23.

A piston 62, which slides within the metal tube 46, is of plastics material and is cup-shaped with its open end facing the end wall 25. The outer end wall 63 of the piston 62 has a part spherical cavity 64 to receive a similarly shaped head 65 on a push rod 66, the annular end cap 54 acting both as a stop limiting outward movement of the piston 62 and as a retainer for the push rod head 65. The push rod 66 extends through a central aperture in the top-hat section portion 61 of the metal retainer 56 and slides within a solid or foam rubber ring 67 which is housed within the annular area defined between the cup-shaped part of the top-hat section portion 61 and the annular end cap 54. The ring 67, which prevents the entry of water and other foreign matter, is not clamped between the metal retainer 56 and the annular end cap 54 so that the push rod 66 can be articulated without the ring 67 being distorted significantly.

A sealing ring 68 of generally rectangular cross-section rests against the inner end of the cup-shaped piston 62 and is engaged on its side opposite to that which engages the piston 62 by the outward flange 69 of a metal member 71 of top-hat section.

A tubular fitting 72 slides within the metal tube 46, has a smaller diameter portion 74 at its end nearer the cavity 27 and a flange 75 at its other end. The fitting 72 has longitudinal slots formed in the wall of its bore, the slots extending from end to end of the bore.

A rod 76 passes through a central opening 77 in the top-hat section member 71 and has a head 78 at its end which is nearer to the piston 62, the head 78 being retained within the top-hat section member 71. A plate 79 which will slide within the cylindrical cavity 27, is fixed to the other end of the rod 76 that slides within the bore of the tubular fitting 72. A second sealing ring 81 of generally rectangular cross-section is fitted in the metal tube 46 and surrounds, with clearance, the smaller diameter portion 74 of the tubular fitting 72. The plate 79 is engaged with the radial annular face of the second sealing ring 81 that faces the end wall 25. A compression spring 82 acts between the second sealing ring 81 and the external flange 75 of the tubular fitting 72 and urges that sealing ring 81 towards the plate 79. A second compression spring 83 acts between the flange 69 of the top-hat section member 71 and urges the piston 62 away from the end wall 25. The spacing between the head 78 of the rod 76 and the plate 79 that is fixed to the other end of the rod 76 is such that, when the piston 62 is fully retracted, the plate 79 holds the second sealing ring 81 in a position in which it is spaced from the annular end surface of the cylindrical boss 27 so that the interior of the metal tube 46 is connected to the reservoir space. This enables liquid in the reservoir space to flow to the working chamber that is defined between the piston 62 and the end wall 25 when the piston 62 is retracted so that the working chamber and the liquid pressure system to which it is connected is maintained full of liquid at atmospheric pressure.

When the piston 62 of the master cylinder 10 is moved by thrust acting on the push rod 66, the plate 79 on the rod 76 is free to move forwardly into the cylindrical cavity 27, so that, during initial movement of the piston 62, the second sealing ring 81 is released to move, under the load of its associated compression spring 82, into contact with the annular end face of the hollow boss 26 thus shutting off the connection between the interior of the metal tube 46 and the reservoir; and, as the piston 62 continues to move forward, liquid pressure is generated within the bore of the metal tube 46 in the master cylinder 10 and is transmitted through the outlet orifice 28 and the tubular connector 29 to the connecting pipe 12 that is fitted onto the tubular connector 29, and through that connecting pipe 12 to the slave cylinder 11.

FIG. 4 shows that the slave cylinder 11 comprises a tubular body 84 which is closed at one end and which has an out-turned rim 85 at the other end. A tubular connector 86 is secured to the closed end wall 87 with its bore in line with an aperture 88 in the end wall 87. The end of the connecting pipe 12 remote from the master cylinder 10 is fitted onto the tubular connector 86.

A piston 89 slides within the bore of the tubular body and has a smaller diameter portion which projects towards the end wall 87. A shallow top-hat section member 91 receives the smaller diameter portion of the piston 89 within its cylindrical recess. A coil spring 92 reacts against the end wall 87 and acts through the top-hat section member 91 to urge the piston 89 away from the end wall 87. A recess 93 is formed in the face of the piston 89 that is remote from the end wall 87 and receives the spherical end 94 of an actuator rod 95 which passes through the open end of the tubular body 84.

An annular connector 96 has an inwardly opening annular recess at one end, which receives the rim 85, and a cylindrical portion which is thickened at the other end. A flexible annular boot 97 is a snap fit over the thickened end of the connector 96 and closely surrounds the actuator rod 95 to prevent the entry of water and other matter into the slave cylinder. The actuator rod 95 is for connection to an annular thrust ring or to a race of a release bearing of the clutch release mechanism in a known manner.

A bleed nipple 98, which is in line with another aperture 99 in the end wall 87 is secured to the end wall 87. The bore of the bleed nipple 98 is tapped to receive a grub screw in the usual manner.

The master cylinder 10 and the slave cylinder 11 are connected to the respective end of the connecting pipe 12 and are filled with liquid before being mounted within the respective square hole 13 and hole 15 in the boss 16. The apparatus is filled with liquid by connecting the cylindrical boss 39 of the reservoir to a source of liquid under pressure, after having removed the reservoir cap 42 and having released the grub screw in the bleed nipple 98 so as to allow liquid to escape from the slave cylinder 11. The grub screw is adjusted to close the bleed orifice defined by the bleed nipple 98 when the liquid flow through the bled nipple includes no air. The filling orifice 34 of the reservoir is then disconnected from the source of liquid under pressure, the apparatus having been filled and bled. The reservoir cap 42 is fitted onto the boss 39 and the vent port 44 in that cap 42 is closed by a strip of adhesive tape 101 which is stuck to the outer surface of the cap 42 as shown in FIG. 2. The strip of adhesive tape 101 is removed from the end cap 42 once the master cylinder 10 has been mounted on the bulkhead 14 and the slave cylinder 11 mounted in the boss 16 as shown in FIG. 1. The apparatus is then ready for use.

FIG. 5 shows that the vent port 44 in the reservoir cap may be closed temporarily by a bung 102 once the apparatus has been filled and bled. The bung 102 would be removed once the master cylinder 10 has been mounted on the bulkhead 14 and the slave cylinder 11 mounted in the boss 16 so as to render the apparatus ready for use.

Figure 6:
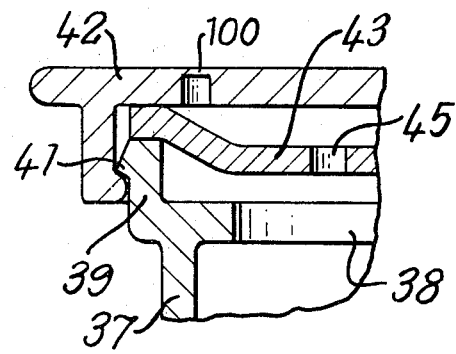

FIG. 6 shows that the end cap 42 may be moulded with a thin puncturable membrane 100 formed as one piece with the remainder of the end cap 42 so that it spans the vent port 44. The membrane 100 would be punctured by any convenient sharp pointed tool once the master cylinder 10 has been mounted on the bulkhead 14 and the slave cylinder 11 mounted in the boss 16 so as to open the vent port 44 and render the apparatus ready for use.

FIGS. 7 and 8 illustrate a modified master cylinder 10A. The following description will be limited to those features of the master cylinder 10A which differ from corresponding features of the master cylinder 10 just described with reference to FIGS. 1 to 3. Features of the master cylinder 10A that are similar to corresponding features of the master cylinder 10 are identified where necessary by the same references. The body 23A of the master cylinder 10A is another moulding of a suitable plastics material and most of its features are similar to like features of the body 23 of the master cylinder 10. The cylindrical wall 35A of the cylindrical reservoir is formed as one piece and is an integral part of the moulded body 23A. The upper end of the cylindrical wall 35A has an external circumferential rib 41A. The reservoir cap 42A is a snap fit over the cylindrical rib 41A of the cylindrical wall 35A. A bellows 103 is located within the reservoir chamber and has its peripheral rim 104 clamped between the rim of the cylindrical wall 35A and the end cap 42A so that the bellows 103 is fixed to the cylindrical wall 35A of the reservoir chamber in a fluid tight manner. The bellows 103 divides the interior of the reservoir chamber into a liquid containing space with which the side opening 34 communicates and an air space at atmospheric pressure which is in free communication with the exterior of the reservoir through the vent port 44A in the end cap 42A. For convenience FIG. 8 shows one half of the bellows 103 contacted and the other half of the bellows 103 extended. It will be noted that the convolutions of the bellows 103 extend in a generally radial direction when the bellows 103 is contracted.

The end cap 42A and the bellows 103 are removed from the reservoir to enable the apparatus to be filled with liquid and bled. The bellows 103 is inserted into the reservoir once the filling and bleeding operation has been concluded, the peripheral flange 104 of the bellows 103 being supported upon the rim of the cylindrical wall 35A of the reservoir and the flat central portion of the bellows 103 resting upon the liquid in the reservoir chamber. The end cap 42A is then snap fitted to the cylindrical wall 35A so that the bellows 103 is secured in position and the apparatus is ready for installation in the motor vehicle.

Use of the bellows 103 eliminates the need for the vent hole 44A to be closed temporarily whilst the apparatus is stored, transported and installed in a motor vehicle. The bellows 103 extend or contract with changes in the level of liquid within the reservoir chamber that occur during installation of the apparatus and during use of the apparatus to operate a friction clutch. The ability of the bellows 103 to extend allows the normal position within the reservoir chamber that the central portion of the bellows 103 adopts when the friction clutch is engaged to move progressively towards the base of the reservoir chamber in which the side opening 34 is formed as parts of the friction clutch wear. Hence the liquid stored within the reservoir chamber between the bellows 103 and the side opening 34 is maintained at atmospheric pressure.

FIGS. 9 and 10 show another form of master cylinder 10B for use in the apparatus described above with reference to FIG. 1. The reservoir chamber is oval and the convolutions of the bellows 103B extend generally parallel to the longitudinal axis of the bellows 103B when the bellows 103B is contracted.

I claim:

1. A method of assembling friction clutch release apparatus on a motor vehicle, the apparatus comprising a driver operable master cylinder which has a driver operable piston slidable in it and a liquid pressure outlet port, and a slave cylinder which has an inlet and an output thrust member, the apparatus being operable by displacement of liquid under pressure from the master cylinder to the slave cylinder to generate a clutch release thrust by way of the output thrust member, there being a liquid reservoir which forms a liquid containing chamber and which has a port which communicates with the liquid containing chamber below the normal level of liquid contained therein, said port being in communication with a port in the master cylinder which is open when the master cylinder piston is at the end of its stroke remote from the master cylinder outlet so that the liquid containing chamber of the reservoir is in communication with the bore of the master cylinder between the master cylinder piston and the liquid pressure outlet, and being closed when liquid is displaced under pressure from the master cylinder through the liquid pressure outlet by movement of the master cylinder piston towards the liquid pressure outlet, and a vent port which communicates with the liquid containing chamber of the reservoir above the normal level of liquid contained therein and which places the space within the liquid containing chamber that is above the normal level of liquid therein in communication with an air space which is at a pressure which is substantially atmospheric, wherein the method comprises filling the apparatus with liquid, bleeding that apparatus before that apparatus is installed on a motor vehicle, and providing an impermeable barrier to prevent leakage of liquid through said vent port during shipment and installation on a motor vehicle, said impermeable barrier being provided by closing the vent port temporarily after the apparatus is bled.

2. A method according to claim 1, including the step of opening the vent port after the apparatus has been installed on a motor vehicle.

* * * * *